(12) United States Patent  
Goldstein et al.

(10) Patent No.: US 9,126,541 B2  
(45) Date of Patent: Sep. 8, 2015

(54) APPARATUS FOR COLLECTION OF DEBRIS ESCAPING AROUND A VEHICLE TAILGATE

(71) Applicants: Kevin Goldstein, Kinnelon, NJ (US); Joseph D. Cassese, Upper Saddle River, NJ (US)

(72) Inventors: Kevin Goldstein, Kinnelon, NJ (US); Joseph D. Cassese, Upper Saddle River, NJ (US)

( * ) Notice: Subject to any disclaimer, the term of this patent is extended or adjusted under 35 U.S.C. 154(b) by 0 days.

(21) Appl. No.: 14/192,418

(22) Filed: Feb. 27, 2014

(65) Prior Publication Data

US 2014/0239660 A1  Aug. 28, 2014

Related U.S. Application Data

(60) Provisional application No. 61/770,463, filed on Feb. 28, 2013.

(51) Int. Cl.
  *B60R 13/01* (2006.01)
  *B60P 1/26* (2006.01)
  *B60P 1/28* (2006.01)

(52) U.S. Cl.
  CPC . *B60R 13/01* (2013.01); *B60P 1/26* (2013.01); *B60P 1/286* (2013.01)

(58) Field of Classification Search
  CPC ............ B22C 5/16; B60J 7/041; B60J 7/141; B60R 99/00; B60P 1/28
  USPC ........... 296/72, 70, 187.03, 187.09, 192, 208, 296/193.02; 248/27.1; 180/90
  See application file for complete search history.

(56) References Cited

U.S. PATENT DOCUMENTS

| | | | |
|---|---|---|---|
| 1,214,045 A * | 1/1917 | Lightburn | 296/51 |
| 2,679,335 A | 5/1954 | Bell | |
| 2,682,975 A | 7/1954 | Stoner | |
| 3,512,206 A * | 5/1970 | Young | 15/346 |
| 3,833,255 A | 9/1974 | Logue | |
| 4,317,592 A * | 3/1982 | Newman et al. | 298/7 |
| 4,723,817 A * | 2/1988 | Wallan | 298/23 MD |
| 4,772,072 A | 9/1988 | Vick, Jr. | |
| 5,046,774 A | 9/1991 | Stockell et al. | |
| 6,929,329 B2 * | 8/2005 | Kent et al. | 298/7 |

* cited by examiner

*Primary Examiner* — Glenn Dayoan  
*Assistant Examiner* — Sunsurraye Westbrook  
(74) *Attorney, Agent, or Firm* — Banner & Witcoff, Ltd.

(57) ABSTRACT

A multi-panel cover includes end panels that connect first and second lateral panels. The lateral panels fit against the end and under the bed of a truck body and tailgate and are maintained in position by magnets incorporated into the seams along the edges and between the panels to collect debris that will otherwise escape through or around the tailgate of the vehicle.

13 Claims, 4 Drawing Sheets

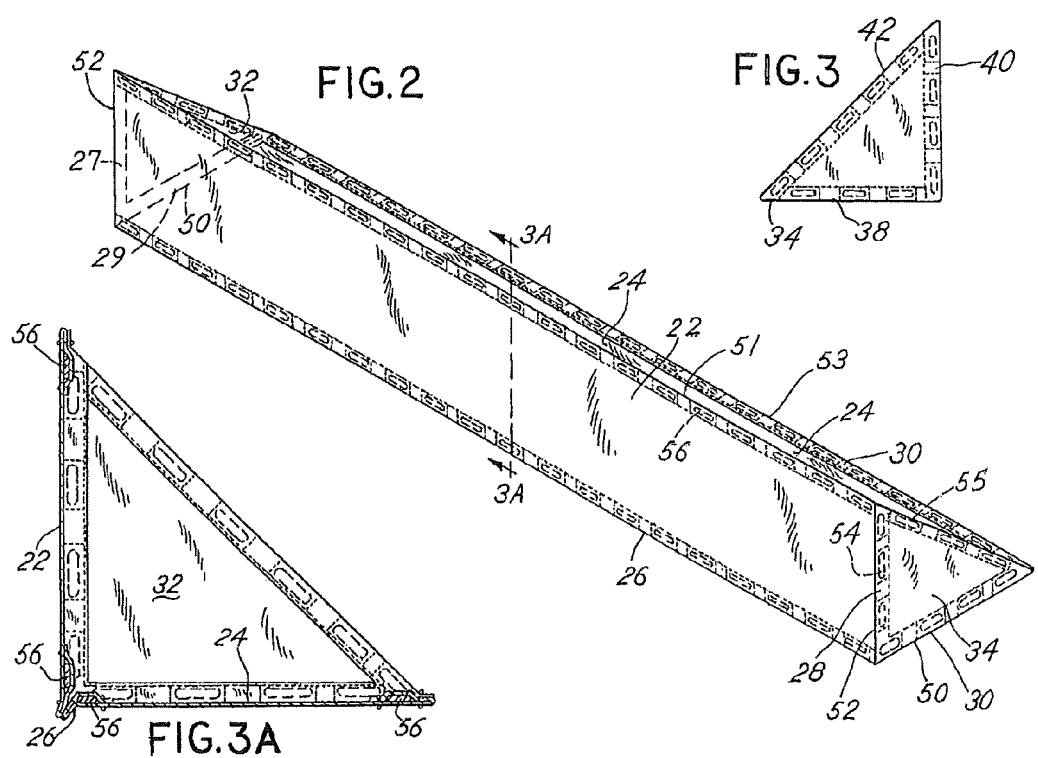

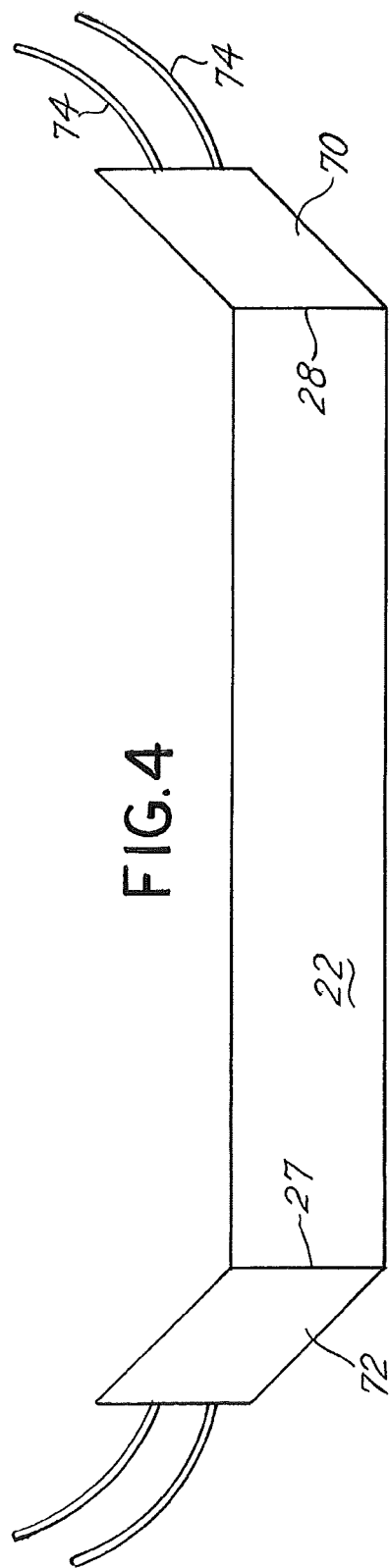
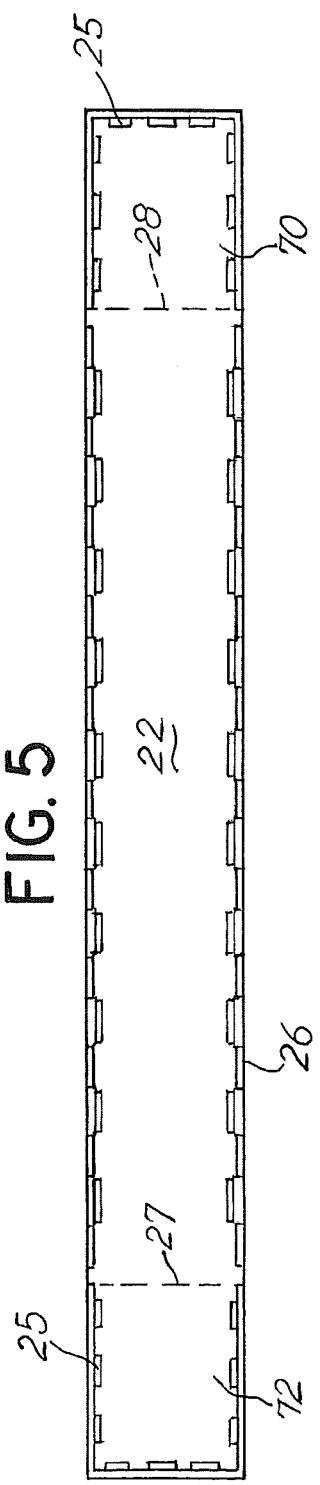

APPARATUS FOR COLLECTION OF DEBRIS ESCAPING AROUND A VEHICLE TAILGATE

CROSS REFERENCE TO RELATED APPLICATION

This is a utility application incorporating by reference and claiming priority to provisional application Ser. No. 61/770,463 filed Feb. 28, 2013 entitled "Apparatus for Collection of Debris Escaping Around a Vehicle Tailgate".

BACKGROUND OF THE INVENTION

Briefly, the present invention relates to an apparatus for collection and retention of debris discharged or escaping around the tailgate of a vehicle such as a construction vehicle, garbage truck or the like.

Highway safety is a continuing concern. Among the aspects of highway safety is a problem associated with vehicles, such as construction vehicles and similar transportation vehicles, which include a bed for the carriage of various materials. Typically, such vehicles will include a truck bed with a tailgate mounted to side walls of the truck bed. The tailgate typically opens in order to enable placement of materials on the bed or to enable efficient discharge of the materials from the bed. Such vehicles, when travelling on highways, may, due to the irregularity of the highway surface, discharge debris as the tailgate is displaced by shaking or otherwise moves causing escape or discharge of debris and other materials. Such materials may also be discharged due to the flow of air over the vehicle cab and around the tailgate.

A solution to this problem is addressed, for example, by U.S. Pat. No. 3,833,255 entitled "Combined Load Cover and Windshield Protector for Dump Truck" incorporated herewith by reference. There are often legal requirements that such covers be provided for dump trucks and other vehicles. However, such vehicles may still exhibit a discharge of debris and other material. Issues of this nature have also been addressed by other patents such as U.S. Pat. No. 2,682,975 entitled "Dumping Box with Hinged Bottom Having Drip Catching Means" and U.S. Pat. No. 2,679,335 entitled "Dribble Gate", both of which are incorporated herewith by reference. Further developments of this nature are directed to the discharge of debris through the slot between a pivoting tailgate and a truck bed. U.S. Pat. No. 5,046,774 entitled "Debris Catcher" addresses such issues and it, too, is incorporated herewith by reference. Another effort in this regard is disclosed in U.S. Pat. No. 4,772,072 entitled "Dump Body Debris Catcher" incorporated herewith by reference.

Nonetheless, the cost of many of these solutions is significant and there has remained the desire to provide a lower cost, yet more highly efficient system to address the issue of escape of debris from dump trucks and other such vehicles. Additionally, a desirable solution to such a problem must consider the safety, the installation of a device, as well as the aspect of simplicity of use, storage of a device of this nature and application of the solution to preexisting truck configurations. Thus, the design for such an apparatus has presented an ongoing problem with respect to the aspects of safety, convenience and cost.

SUMMARY OF THE INVENTION

Briefly, the present invention comprises an assembly of fabric panels which are designed to fit over a section of the tailgate and a portion of the bed of a truck in a manner which covers the opening or seam between a tailgate, the side walls and the bed of the truck. The fabric may be a mesh-like canvas similar to the type of covering that is often used for covers placed over the open top of a vehicle bay or bed such as a dump truck or the like. Such covers typically are used to cover a load of debris or materials carried in the bed of the dump truck or transport vehicle. The mesh-like canvas material is permeable to air thus allowing the passage of air therethrough from wind currents and other air flow due to drafting of the vehicle as it is moving during its use as a transport vehicle. A feature of the invention comprises a design to prevent the device or apparatus described from being engaged by air flow and detached from the vehicle during travel of the vehicle thereby damaging its effectiveness.

Thus, it is an object of the invention to provide a cover which has a design capable of being easily maintained by attachment to a vehicle yet easily removed by a vehicle operator when necessary and reattached when necessary.

It is a further object of the invention to provide a debris collection device which is compact, which may be folded for easy storage, and which is rugged and inexpensive.

Yet another object and feature of the invention is to provide a cover which may be easily attached to multiple sizes of vehicle truck beds having various sizes and designs of tailgates associated with the truck bed.

Another object and feature of the invention is to provide a rugged yet lightweight and easily manipulated and adjustable cover device for collecting debris which might otherwise escape from the truck bed of a vehicle and thereby cause safety problems to arise.

These and other objects, advantages and features of the invention will be detailed in the description which follows that discusses and discloses an exemplary version of the subject matter of the invention.

BRIEF DESCRIPTION OF THE DRAWING

In the detailed description which follows, reference will be made to the drawing comprised of the following figures:

FIG. 2 is an isometric view of the apparatus for collecting and retaining debris as depicted in FIG. 1;

FIG. 3 is an elevation view of one side end panel of the cover of FIG. 2;

FIG. 3A is an elevation view of the opposite side end panel depicted in FIG. 3;

FIG. 4 is an exploded view of the component parts of an alternative embodiment of the invention; and FIG. 5 is an elevation view of the embodiment of FIG. 4 depicting additional features;

DESCRIPTION OF EMBODIMENTS OF THE INVENTION

Figure 1:
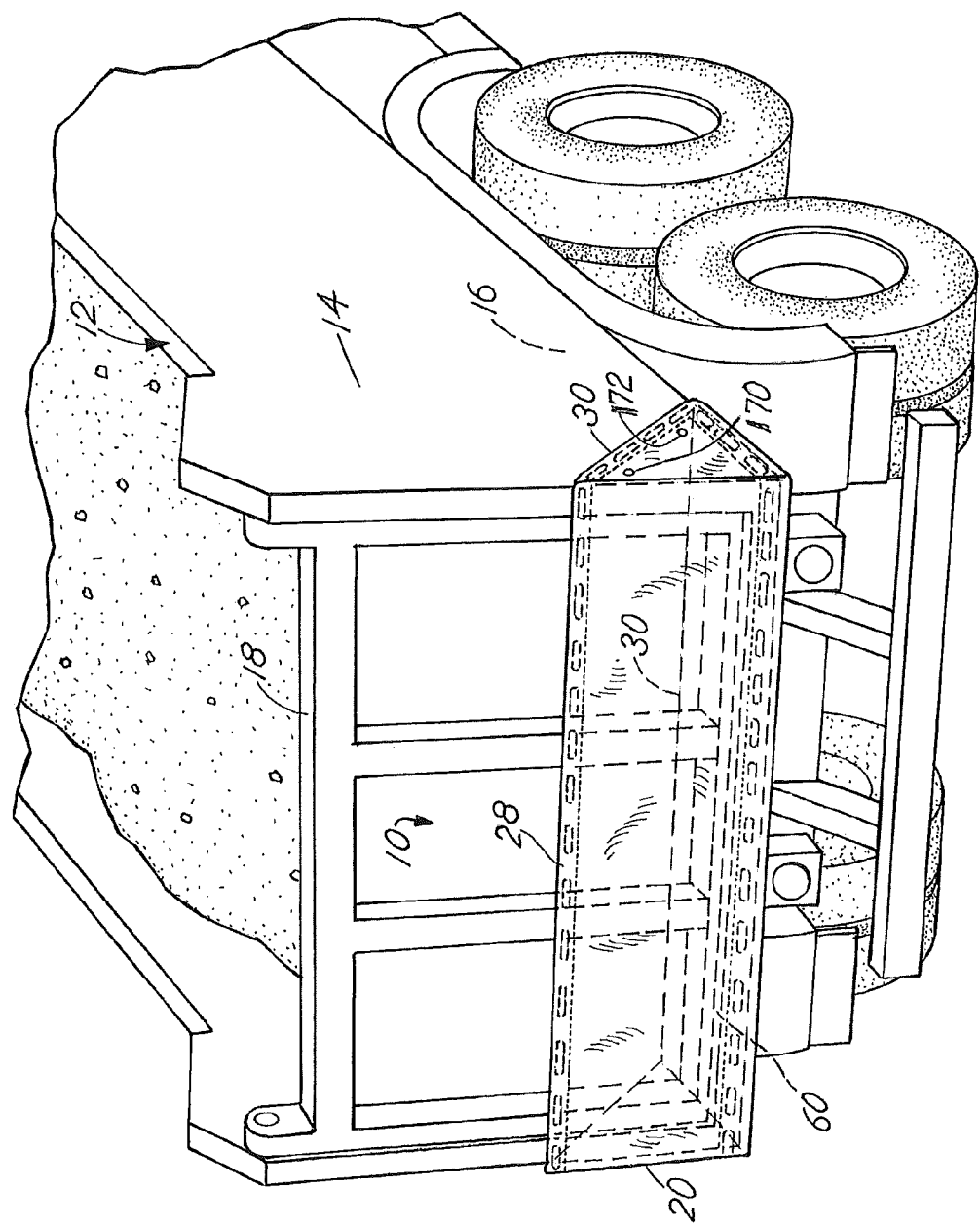
FIG. 1 is an isometric view depicting an example of the invention as incorporated and positioned over the tailgate and bed of a carriage vehicle.

Referring to the figures, FIG. 1 depicts a vehicle of the type which is a candidate for use of the apparatus of the present invention. Thus, a truck 10 having a vehicle bed assembly 12 with opposite, lateral side walls, such as walls 14, and an internal support bed platform 16 further includes an end tailgate 18. Typically, the tailgate 18 is pivotally mounted to side walls 14 and may swing about an attachment or connecting axis, may fold outwardly and/or downwardly, or may fold by means of hinges along one or the other of the vertical side walls 14. In some instances, the tailgate 18 may incorporate a mechanism which provides tilting and lowering so that a load carried on the internal bed platform 16 of the truck 10 may be placed on the gate as a platform and lowered in order to remove the contents from the truck bed 16. The subject matter of the present invention is designed for utilization with multiple styles of tailgate constructions such as those discussed.

The tailgate cover 20 of the invention includes a first generally vertical, end panel 22 and a second generally horizontal, end panel 24. The panels 22 and 24 are generally rectangular and include a common elongate generally horizontal seam or side 26. Vertical panel 22 includes parallel, lateral sides 27, 28. The horizontal panel 24 includes generally parallel lateral sides 29, 30. The panels 22 and 24 may be formed as separate elements which are stitched together along the seam or side 26 if desired. The panels 22 and 24 are typically of similar size and dimension. Typically, the side to side dimension of the panels 22 and 24 exceeds or is generally equal to the width of the bed 12 or the distance between the walls, such as walls 14 of the vehicle 10. This is an important aspect of the invention inasmuch as this aspect enables the apparatus or cover of the invention to be placed around the entire outside surface of the truck bed 12. The size and construction of the various panels enables reversal of the attachment of the apparatus embodiment depicted.

The cover further includes end side panels 32, 34 that are substantially identical in configuration. In other words, they are generally congruent in configuration and shape. For example, end panel 34 has the configuration of an isosceles triangle having side legs 38 and 40 which are equal and a base 42. In the embodiment depicted, the panels 32 and 34 are thus substantially congruent and are in the form of an isosceles triangle. However, other shapes may be utilized in order to accomplish the goals and features of the invention, for example, rectangular panels which are attached to a generally horizontal and a generally vertical end panel. Among those goals and features is the aspect of fitting over and around the sides of the truck bed 12 as depicted, for example, in FIG. 1.

The legs or sides 38, 40 of the isosceles triangle shaped end panels 32 and 34 are dimensioned to be substantially equal, respectively, to the side edges or side dimension of panel sides 27, 28, 29, 30. Thus, all of the component panels in the embodiment depicted are stitched together, though panels 22 and 24 may be formed from a single fabric sheet and folded along the longitudinal edge or seam 26 to form the configuration depicted in FIG. 2.

All of the seams or edges of the cover are folded over and stitched with encapsulated magnets, such as magnets 54 and 56 fitted into pockets in the folded over cover material of edges 51, 53. The magnets 54, 56 may be of any desired configuration or shape. In the embodiment depicted, the magnets 54, 56 comprise elongate members or bars which are in the range of 2 to 5 inches long and which are spaced from one another in the range of 2 to 5 inches around the periphery of all of the seams and edges of the cover.

The magnet retaining edges of the cover maintain the cover tightly in place upon the truck bed or body 12 as depicted in FIG. 1. Because of the number of magnets, their spacing, and the fact that those magnets are maintained in the seamed portions or portions which join the separate panels as well as in the lateral edges and side edges 50, 52, 55, 26 of the panels, ensures that multiple points of contact will be maintained between the cover and the truck body. Thus, the edges fit under the truck body or bed and are attached thereto as well as along the vertical walls 14 of the gate 18 as well as along side walls 14 and underside of bed platform 16.

The purpose of the cover is to fit over a gap 60 through which debris and material may discharge from the interior of the truck body 10. This gap 60 may vary in size thus resulting in the variance in particulates and materials which will sift therethrough or pass therethrough. Driving conditions may also affect the manner in which the gate 18 fits and the tolerance of the gate 18 may vary with respect to various types of vehicles. The cover of the present invention accommodates those variances. The cover, thus, retains debris which will fall or exit from the vehicle as a result of gravity, vibration and vehicle movement.

The positioning of the magnets and the number of magnets, their spacing and their configuration all become beneficial elements with respect to the cover. That is, their positioning and the other features associated with the magnets including the feature incorporating them within pockets or folded over portions of the cover material enable the cover to be molded tightly against the body of the vehicle and enable the cover to provide a universal fit to multiple types and styles of vehicles. Consequently, the lateral width or lateral dimension of the cover may vary somewhat, yet still cover the gap 60 in a meaningful and functional manner.

Another feature of the means of attachment is that the cover may be easily, manually attached, rigidly attached, adjustably attached and easily removed by manual operation. The magnets can be individually detached in a manual fashion. Additionally, because the cover is made from a flexible material, the cover may be folded into a compact configuration and the magnets can be utilized to maintain the cover in the desired and folded condition as a compact package that can be stored easily. Attachment of the cover to a truck body is also accommodated by the design. That is, the upper row of magnets and the upper edge 28 of the panel 22 may be easily attached as a first effort with respect to attachment of the cover to thereby position the cover in a manner which will enable positioning of the other elements or panels comprising the cover.

As an added feature of the invention, however, the triangular panels, such as panel 30, may include grommet openings, such as openings 170 and 172, to which a bungee cord or rope can be connected for retaining the cover in position. This may be useful with respect to those truck bodies which are manufactured from materials, such as aluminum, that are not magnetic. As a consequence, the cover of the present invention is capable of utilization with multiple types of truck bodies made from multiple materials. For example, as mentioned, aluminum bodies may utilize the cover. However, bodies which incorporate wood, for example, will also be able to utilize successfully the cover of the present invention. Thus, there are various options and alterations and changes and inclusions of alternative aspects of the invention and substitution of various components.

The assembly or cover is reversible. That is, either side of panels 22, 24 may be fitted against tailgate 18 and the seam 26 may be reversed in side to side alignment from left to right or vice-versa. Further, the magnets may be replaced since they may be retained in pockets in the fabric forming the cover by clips, or fasteners, or zippers.

FIGS. 4-7 illustrate further embodiments, aspects and features of the invention. In FIGS. 4 and 5 panels 70, 72 is affixed or attached respectively to the vertical side edge 27, 28 of the panel 22. The panels 70 and 72 may assume any desired shape. The embodiments depicted employ a generally rectangular shape for the panels 70, 72. Ropes or bungee cords or other attachment apparatus 74 may be affixed to the panels 70, 72 to augment the attachment of the cover to a vehicle. The panels 70, 72 may also include magnets 25.

Figure 6:
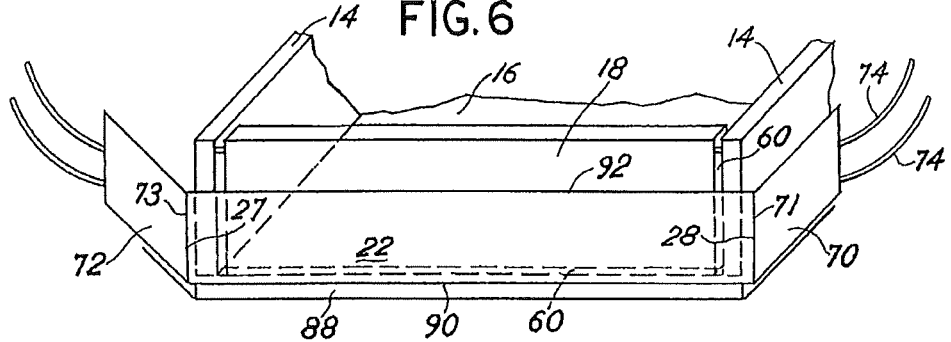
FIG. 6 is on isometric view of the embodiment of FIG. 4 depicting the attachment thereof to a truck bed.

FIG. 6 illustrates the manner of positioning of the generally rectangular elongate panel 27 relative to a tailgate 18 between side walls 14 of a truck bed 16. The tailgate 18 is attached to and typically pivots about an axis transverse to the truck bed side walls 14. Thus, when the bed 16 of a truck is filled with material and locked into position the cover assembly is positioned over lower part of the tailgate 18 and end of bed 16. However, due to vibration and movement of the component parts of the truck, debris such as sand, gravel and other materials may "escape between the pivotal tailgate 18, the side walls 14 and the truck bed 16". Placement of the substantially elongate panel 22 having a lower side edge 90 and an upper side edge 92 is thus effected and maintained by means of magnets as depicted by the array of magnets 25 in FIG. 5. The side or lateral end panels 70 and 72 which are attached to the panel 22 along the seams 71 and 73 are also attached to the outside of respective side walls 14. The side panels 70 and 72 thus are retained in a manner, such as described above, to tightly effect wrapping the fabric panel 22 and closure of the spacing 60 between the tailgate 18 and the walls 14 as well as the bottom bed panel 16 of the truck bed. It is noted that panel 22 may have a vertical dimension adequate to cover the entire tailgate. The vertical dimension may be postulated by evaluation of the material being transported. That is finer particulate materials may necessitate a panel which covers the entire tailgate or extends over the top of the tailgate.

Figure 7:
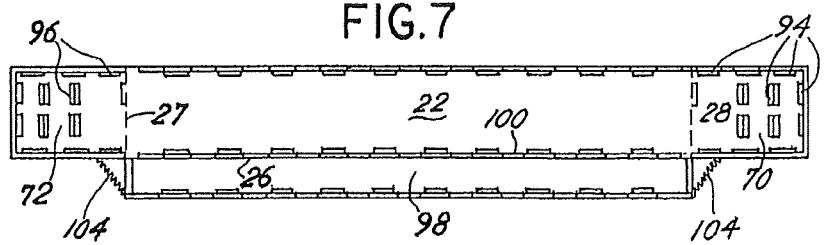
FIG. 7 is a plan view of a variation of the embodiment of FIG. 4.

Further as depicted in FIG. 7 the embodiment of FIGS. 4, 5, and 6 may have additional features. For example, the panel 70 may include an array of magnets such as magnets 94 and 96 for the side panels 70 and 72 respectively. The magnets 94, 96 are augmented for example, by bungee cords 74 or straps which hold the lateral side panels 70, 72 in position.

An additional feature is inclusion of an auxiliary flexible material panel 98 which is attached to the generally rectangular lateral panel 22 along a seam 100. The auxiliary panel 98 forms a generally coterminus seam 100 with bottom edge 90 of the panel 22. Further, the auxiliary panel 98 may include magnets 102 in an array which will facilitate placement of the auxiliary panel 98 to the bottom edge of bed 88 or folded under the bottom edge of the truck bed 88. Further, the auxiliary panel 98 may include elastic tethers 104 connecting the opposite ends thereof respectively to the lateral side panels 70 and 72 to facilitates positioning of panel 98.

Multiple variations of the assembly and the construction described are possible. Features which are considered to be integral to the construction is the employment of multiple individual magnets in various arrays incorporated in the panels especially along the edge of the panels so that the device or apparatus can be utilized with multiple truck bed configurations and designs. For example, the two or more panels may be formed from a single sheet of material folded and formed from folding a single sheet of material thereby defining a boundary or seam (e.g. 100) at the juncture of the panels 22, 24. Magnets may be encapsulated in the pockets formed on the panels or adhered the panels with an appropriate adhesive. Thus, while there has been set forth a preferred embodiment of the invention, the invention is to be limited only by the following claims and equivalence thereof.

What is claimed is:

1. Apparatus for collection and retention of debris discharged from an opening in a tailgate assembly of a truck vehicle, said collection and retention apparatus comprising:

a cover assembly of flexible, air permeable fabric, first and second generally rectangular, lateral panels having a longitudinal, side to side dimension generally sized to extend over a said opening between opposite sides of a said tailgate assembly, said lateral panels each having a first lateral side edge and an opposite second lateral side edge, said first and second lateral panels joined along a longitudinal seam between said first and second side edges;

said cover assembly further comprising generally congruently, generally triangularly shaped first and second flexible side panels, said first side panel having two sides joined respectively to said first lateral side edge of said first and second lateral panels, said second side panel having two sides joined respectively to said second lateral side edge of said first and second lateral panels;

said lateral panels and said side panels, in combination, defining a generally rectangular circumferential opening with a boundary formed by connected side edges of said panels, said opening defining a periphery having a periphery side edge section of said first and second lateral panels and a periphery side edge section of said first and second side panels;

said periphery side edge sections each including multiple, spaced, magnetic fastening elements attached along the periphery whereby the lateral panels and said side panels form a pocket capable of fitting over a vehicle tailgate opening maintained in position on said tailgate assembly by said magnetic fastening elements.

2. The apparatus of claim 1 wherein said first and second side panels comprise a generally isosceles triangle with a base side comprising a portion of the circumferential opening.

3. The apparatus of claim 1 wherein said magnetic fastening elements comprise magnets at least partially encapsulated in said panels.

4. The apparatus of claim 1 wherein said magnetic fastening elements comprise magnets substantially encapsulated in said panels.

5. The apparatus of claim 1 further including auxiliary first and second attachment elements affixed respectively to said side panels.

6. Apparatus for collection and retention of debris discharged from a gap opening in a tailgate assembly of a truck vehicle comprising:

a cover assembly of a flexible air permeable fabric, first generally rectangular, lateral panel having a longitudinal dimension extending substantially between opposite spaced sides of a said tailgate assembly mounted on a vehicle bed to extend over a said opening, said first lateral panel having a top side edge, a bottom side edge generally parallel to the top side edge, a first lateral side edge and an opposite, second lateral side edge generally parallel to said first lateral side edge, said first and second lateral side edges of said first lateral panel extending between the top side edge and the bottom side edge of said first lateral panel;

said cover assembly further comprised of first and second side panels, said first side panel having a side panel side edge forming a seam generally coterminous with the first lateral side edge and joined to said first lateral side edge of said first lateral panel, said second side panel having a side panel side edge forming a seam generally coterminous with the second lateral side edge and joined to said second lateral side edge of said second lateral panel;

said first, generally rectangular, lateral panel and said first and second side edge panels in combination having a single circumferential boundary including a generally rectangular pattern section, said pattern section extending along and including the top side edge, the bottom side edge, and the spaced, generally parallel side edges of said first lateral panel;

said first lateral panel including a plurality of spaced, magnetic elements located along the pattern section to maintain the first lateral panel over a said opening; and said first and second side panels each further including attachment elements for fastening said side panels to a truck bed assembly.

7. The apparatus of claim 6 wherein said attachment elements comprise one or more elements selected from the group considering of straps, ropes, cords, magnets and bungee cords fastened to at least one of said side panels.

8. The apparatus of claim 6 further including an auxiliary flexible fabric panel having an edge affixed to the bottom side edge of the first generally rectangular lateral panel along a linear seam, said linear seam extending substantially between the generally parallel lateral side edges of said first lateral panel, said auxiliary panel including a plurality of magnetic elements, said auxiliary panel foldable along said linear seam whereby the fabric panels are capable of being fitted and retained over a said tailgate opening of a said tailgate assembly by said magnetic elements.

9. The apparatus of claim 8 including a tether connecting the auxiliary panel and the side panels.

10. The apparatus of claim 9 wherein said auxiliary panel includes a peripheral boundary with an array of multiple, spaced magnetic elements.

11. The apparatus of claim 8 wherein said auxiliary panel includes an array of multiple, spaced magnetic elements.

12. The apparatus of claim 6 further including multiple, spaced magnetic elements incorporated in at least one side panel.

13. The apparatus of claim 12 wherein said auxiliary panel includes a peripheral boundary with an array of multiple, spaced magnetic elements.

\* \* \* \* \*